United States Patent [19]

Umemura et al.

[11] Patent Number: 5,073,313

[45] Date of Patent: Dec. 17, 1991

[54] PROCESS FOR PRODUCING LOW-DUST-LEVEL POLYCARBONATE MOLDED ARTICLE

[75] Inventors: Toshikazu Umemura; Makoto Matsumura, both of Osaka; Toshiaki Izumida; Kazuyuki Akahori, both of Kanagawa, all of Japan

[73] Assignee: Mitsubishi Gas Chemical Co., Ltd., Tokyo, Japan

[21] Appl. No.: 557,236

[22] Filed: Jul. 25, 1990

[30] Foreign Application Priority Data

Jul. 25, 1989 [JP] Japan .................................. 1-192368

[51] Int. Cl.$^5$ ...................... B29C 45/48; B29C 45/60; B29C 45/62
[52] U.S. Cl. ...................................... 264/1.1; 264/1.3; 264/106; 264/328.1; 264/331.21; 264/337; 366/266; 425/207; 425/542
[58] Field of Search ...................... 264/1.3, 2.2, 328.1, 264/1.1, 337, 106, 331.21; 425/207, 542; 366/266

[56] References Cited

U.S. PATENT DOCUMENTS 4,898,529  2/1990  Muchnik et al. .................... 425/542

FOREIGN PATENT DOCUMENTS 121126  7/1984  Japan .................................. 264/1.1

*Primary Examiner*—James Lowe
*Attorney, Agent, or Firm*—Sughrue, Mion, Zinn, Macpeak & Seas

[57] ABSTRACT

A process for producing a polycarbonate molded article having a low dust level from a polycarbonate resin in the form of a powder or pellets by injection molding using an injection molding machine. The injection molding machine includes a cylinder whose inner circumferential wall is made of a corrosion- and abrasion-resistant alloy from alloy components (1), (2), or (3) given below and a screw part made of a steel having a metal coating formed of hard chromium plating or hard nickel plating or formed of titanium carbide or tungsten carbide, or is made of SUS420, SUS440, Hastelloy C, or a steel of alloy component (4) given below:

Alloy components (1):
 C: 0.5–1.5 wt%
 Si: 1.0–2.0 wt%
 B: 0.5–2.5 wt%
 Ni: 10.0–20.0 wt%
 Cr: 20.0–30.0 wt%
 W: 10.0–20.0 wt%
 Cu: 0.5–2.0 wt%
 Remainder: Co and unavoidable impurities,
Alloy components (2):
 Ni: 0.0–2.0 wt%
 Cr: 5.0–15.0 wt%
 Fe: 0.0–1.0 wt%
 Mn: 0.1–2.0 wt%
 Si: 0.2–4.0 wt%
 B: 2.0–4.0 wt%
 Remainder: Co and unavoidable impurities,
Alloy components (3):
 Cr: 5.0–10.0 wt%
 Co: 5.0–40.0 wt%
 Fe: 0.0–10.1 wt%
 Mn: 0.2–2.0 wt%
 Si: 2.0–10.0 wt%
 B: 2.0–4.0 wt%
 Reaminder: Ni and unavoidable impurities,
Alloy components (4):
 C: 0.5–1.5 wt%
 Cr: 10.0–20.0 wt%
 Mo: 1.5–2.5 wt%
 V: 0.5–1.5 wt%
 Remainder: Fe and unavoidable impurities.

4 Claims, No Drawings

PROCESS FOR PRODUCING LOW-DUST-LEVEL POLYCARBONATE MOLDED ARTICLE

FIELD OF THE INVENTION

The present invention relates to a process for producing a low-dust-level polycarbonate molded article in which the number of dust particles with a particle size of 0.5 to 1.0 μm present therein is $10 \times 10^4$ or less per gram. More particularly, the present invention relates to a process for producing a low-dust-level polycarbonate molded article, in which process the increase in the dust level due to burning and contamination with metal impurities during injection molding is restrained by using an injection molding machine having a cylinder and a screw made of specific materials having corrosion resistance and abrasion resistance.

BACKGROUND OF THE INVENTION

Recently, polycarbonates have come into extensive use in fields such as optical disks, lenses, optical waveguides, and the like. In the fields of conventional general articles the, use of polycarbonate resins in producing precision molded articles having smaller wall thicknesses is increasing based on the heat resistance, transparency, safety, dimensional stability, mechanical strength, and other properties possessed by such resins.

Of those purposes of use, where transparency is an essential requirement, such as in optical applications in particular, molded articles are prevented from exhibiting their desired functions by dust particles, i.e., contaminants, contained in the articles.

For this reason, many studies have been made to lower the dust particle content in raw material polycarbonate resins. However, the difference in contamination caused in injection molding due to differences in materials among the injection molding machines has not received much attention, and there has been a pronounced tendency to believe that the burning, metal impurities, and other contaminants present in molded articles are attributable to differences in the raw material polycarbonates in heat resistance, etc.

In conventional injection molding, raw polycarbonate resins have been contaminated with a large amount of dust particles and the injection molding conditions have been considerably mild as compared to those for recent purposes of use. Hence, dust particle formation during injection molding operations has been negligible in most cases. Resin manufacturers, therefore, have been first required to make raw polycarbonates clean.

Injection molding machines have been suitably selected by raw resin manufacturers or users of the raw resins from various kinds of injection molding machines provided by manufacturers thereof, and the raw resin manufacturers and the resin users have been unable to afford to consider details of their injection molding machines, or there has conventionally been no necessity of doing so. Further, ordinary injection molding machine manufacturers have had no knowledge of the fact that the dust particle contents in injection-molded articles vary depending on the materials used to manufacture the molding machine. Furthermore, it is difficult to say that recent molding processes for producing these molded articles which are being conducted under exceedingly severe conditions as compared to conventional processes have been properly understood.

On the other hand, it has been known from experience that carbon steels catalytically promote gelation of polycarbonate resins. The present inventors have ascertained that when a molten polycarbonate resin is brought into contact with SACM steel (Al-Cr-Mo steel), which is a low-alloy steel and is one of the ordinary carbon steels, browning of the resin occurs on the surface of the steel and, in extreme cases, this brown resin turns black. Since this brown or black substance was insoluble in halogenated hydrocarbons that are a good solvent for polycarbonate resins, it has been presumed that this product is a gelation product formed through the decomposition, network formation, and even carbonization of the polycarbonate resin. Such products are formed in large quantities even when molding is conducted in dust particle-controlled clean atmospheres where raw polycarbonate resins are fed in a completely sealed state.

It is clear from the above that most of the dust particles contained in conventional low-dust-level polycarbonate molded articles were newly formed in the injection molding machine when the solid polycarbonate was remelted or plasticized and then injected. It can, therefore, be presumed that in order to produce polycarbonate molded articles having a low dust level, use of a special molding machine, particularly use of specific kinds of materials which result in little formation of dust particles, is essential.

However, materials which are usable for producing cylinders, screws, and other parts of injection molding machines which cause little dust particle formation, and can be fabricated economically, have not yet been found.

SUMMARY OF THE INVENTION

The present inventors have conducted intensive studies in regard to the relationship between dust particle formation and the material of the cylinder or screw in an injection molding machine or the material of a check ring provided at the tip of the screw. As a result, it has now been found that dust particle formation can be greatly diminished by using an injection molding machine made of specific materials. The present invention has been completed based on this finding.

Accordingly, an object of the present invention is to provide a process for producing a low-dust-level polycarbonate molded article by means of an injection molding machine made by using specific materials.

The process for producing a polycarbonate molded article having a low dust level from a polycarbonate resin in the form of a powder or pellets by means of injection molding according to the present invention is characterized in that an injection molding machine used in the process is an injection molding machine comprising a cylinder having an inner circumferential wall made of a corrosion-resistant and abrasion-resistant alloy comprising the following alloy components (1), (2), or (3) and a screw part made of a steel having a metal coating formed by hard chromium plating or hard nickel plating or formed of titanium carbide or tungsten carbide, or made of SUS420, SUS440, Hastelloy C, or a steel comprising the following alloy component (4):

Alloy component (1):
C : 0.5-1.5 wt %
Si: 1.0-2.0 wt %
B : 0.5-2.5 wt %
Ni: 10.0-20.0 wt %
Cr: 20.0-30.0 wt %
W : 10.0-20.0 wt %

Cu: 0.5-2.0 wt %
Remainder: Co and unavoidable impurities,
Alloy component (2):
Ni: 0.0-2.0 wt %
Cr: 5.0-15.0 wt %
Fe: 0.0-1.0 wt %
Mn: 0.1-2.0 wt %
Si: 0.2-4.0 wt %
B : 2.0-4.0 wt %
Remainder: Co and unavoidable impurities,
Alloy component (3):
Cr: 5.0-10.0 wt %
Co: 5.0-40.0 wt %
Fe: 0.0-10.0 wt %
Mn: 0.2-2.0 wt %
Si: 2.0-10.0 wt %
B : 2.0-4.0 wt %
Remainder: Ni and unavoidable impurities,
Alloy component (4):
C : 0.5-1.5 wt %
Cr: 10.0-20.0 wt %
Mo: 1.5-2.5 wt %
V : 0.5-1.5 wt %
Remainder: Fe and unavoidable impurities.

In preferred embodiments of this invention, the polycarbonate resin powder or pellets used in injection molding are such that the number of dust particles having a particle size of 0.5 to 1.0 $\mu m$ present therein is $5.0 \times 10^4$ or less per g of the resin; in the injection molding machine, the main body of the screw is made of a steel having a metal coating formed by hard chromium plating or hard nickel plating or formed of titanium carbide or tungsten carbide, and a check ring, the part of the screw to be in contact with the check ring, and the screw tip part, are made of SUS420, SUS440, Hastelloy C, or a steel comprising alloy component (4); and the polycarbonate molded article made by injection molding is an optical disk or a lens.

DETAILED DESCRIPTION OF THE INVENTION

The polycarbonate resin used in this invention is an aromatic polycarbonate resin produced by polymerizing a dihydric phenol monomer through carbonate bonds by means of a phosgene process, an ester interchange process, a pyridine process, or other processes. Although the polycarbonate resin most generally is one produced by using bisphenol A [=2,2-bis(4-hydroxyphenyl)propane, hereinafter referred to as "BPA"] as a monomer, polycarbonate resins that can be used in this invention further include transparent resins such as a graft copolymer of such BPA polycarbonate and another resin. In addition, various kinds of polycarbonate-based resin compositions can also be advantageously used in this invention to diminish burning during injection molding.

Because the present invention is for producing low-dust-level polycarbonate molded articles, the aromatic polycarbonate resin pellets or powder used should, of course, be a resin material having a low dust level corresponding to the dust level required in the intended molded articles.

Dust particles contained in a raw polycarbonate resin powder are normally present according to a certain particle size distribution. If the dust particle content is lowered to reduce the number of dust particles having a particle size of 0.5 to 1 $\mu m$ to $5.0 \times 10^4$ or less per g of the resin, the number of dust particles of 1 to 10 $\mu m$ is reduced to 1,000 or less per g and that of dust particles of 10 to 50 $\mu m$ to 10 or less per g.

Therefore, the number of dust particles having a particle size of 0.5 to 1 $\mu m$ present in the polycarbonate resin powder or pellets used in this invention is preferably $5.0 \times 10^4$ or less per g of the resin. For optical applications such as optical disks and lenses, in particular, the number of such dust particles is preferably $1.0 \times 10^4$ or less per g of the resin and, if such raw resin is used, a molded article having a dust particle content of $2.0 \times 10^4$ or less per g can be obtained according to the present invention. In the case where such a low-dust-level article is an optical disk, it exhibits excellent performances in terms of error rate and reliability in a long-lasting, high-temperature and high-humidity atmosphere.

In the injection molding machine used in this invention, the inner circumferential wall of the cylinder and the screw surfaces, i.e., the parts to be in contact with a molten aromatic polycarbonate resin, are made by using the specific steel materials as described above.

The inner circumferential wall of the cylinder is manufactured by using an alloy comprising the alloy components (1), (2), or (3) described above.

Although the whole cylinder can be made from an alloy comprising the alloy components (1), (2) or (3), those alloys are expensive and, in particular, an alloy comprising the alloy component (1) is extremely difficult to machine. Therefore, it is preferred that a high-strength steel such as SACM645, SKD11, SKD61, SCM440, SNCM439, SUS440, SUS304, SUS316, or the like be used as a back metal, with a layer of the above alloy being formed as an inner circumferential wall inside the back metal layer. Methods for forming the alloy layer are not particularly limited. but preferred and representative methods include the HIP process utilizing powder metallurgy, and the like.

The alloy comprising alloy component (2) corresponds to the so-called H-alloy 50 (produced by Hitachi Metal Ltd.) and that comprising alloy component (3) corresponds to the so-called H-alloy 60 (produced by Hitachi Metals Ltd.) or N-alloy (produced by Japan Steel Works Ltd.), and castings of these alloys can be produced by the centrifugal casting method which is industrially well known. This centrifugal casting method is such that the components in the melt are separated by centrifugal force generated by rotating the mold and the alloy castings obtained are dense and are difficult to form into a porous structure.

On the other hand, the screw employed in the injection molding machine is such that at least its main body is made of a steel having a metal coating formed by hard chromium plating or hard nickel plating or formed of titanium carbide or tungsten carbide, or made of SUS440, Hastelloy C, or a steel comprising alloy component (4) described above. Examples of the steel for use in the main body of screw are carbon steel, alloy carbon steel, and the like. Further, representative examples of the hard nickel plating are Kanigen plating (Ni-Co system), composite plating (Ni-Co-Cr system), and the like. Parts having metal coatings formed by plating have insufficient impact strength, so that the metal coatings may peel off to cause the base thereof to be exposed, and, as a result, dust particles attributable to burning, etc., increase significantly in number and the peeled metal coatings cause metal contamination. Therefore, it is preferred that the check ring provided at the tip of the screw, this part of the screw coming into contact with the ring, and the screw tip, all of which should withstand considerable loads, be made of a steel having a metal coating formed of titanium carbide or tungsten carbide, or made of SUS420, SUS440, Hastelloy C, or a steel comprising of of alloy component (4) described above.

Furthermore, it is preferred that the inside of the nozzle provided at the tip of the injection molding machine and the molten resin channel in the mold also be made by means of hard chromium plating or hard nickel plating or by using an alloy comprising alloy component (1), (2), or (3), SUS420, SUS440, or Hastelloy C. Care should be taken when stainless steels of the austenitic type such as SUS304, SUS316, SUS310, and others are employed, because contact of molten polycarbonate resins with these kinds of steels is apt to result in burning.

As described above, according to the process of this invention for producing a low-dust-level polycarbonate molded article, which uses an injection molding machine wherein a cylinder and screw, those parts being in contact with a molten resin, are made by using specific materials, dust particle increase during injection molding can be greatly diminished. Therefore, the process of this invention is exceedingly useful for the production of molded materials for use in optical articles required to have a very low dust level. Furthermore, the process is also extremely significant in general purposes of use, because not only do the resulting molded articles can have improved transparency due to dust particle reduction, but deterioration of the physical properties of the molded articles due to the decomposition and deterioration of the resin during injection molding can be diminished.

The present invention will be explained in more detailed by reference to the following Examples and Comparative Examples, but the Examples should not be construed to be limiting the scope of the invention.

EXAMPLE 1 AND COMPARATIVE EXAMPLE 1

Injection molding machines employing cylinders and screws made of alloys having the compositions (the alloy components) shown in Table 1 were used.

TABLE 1

| Components (%) | Alloy for cylinder main body | | | | Alloy for screw main body | | | | |
|---|---|---|---|---|---|---|---|---|---|
| | 1 | 2 | 3 | 4 | 1 | 2 | 3 | 4 | 5 |
| C | 1.6 | 1.5 | 0.1 | 0.1 | 1.6 | 1.5 | | | 0.5 |
| Si | 0.3 | 2.0 | 3.2 | 3.2 | 0.3 | | | | 0.3 |
| Mn | 0.5 | | 0.1 | 0.1 | 0.5 | | | | 0.5 |
| P | 0.03 | | | | 0.03 | | | | 0.03 |
| S | 0.03 | | | | 0.03 | | | | |
| B | | 2.5 | 3.2 | 3.2 | | | | | |
| Ni | | 20 | 1.5 | Remainder | | | | | |
| Cr | 13 | 30 | 7.4 | 7.5 | 13 | 20 | | | 1.5 |
| W | | 20 | | | | | | | |
| Cu | | 2.0 | | | | | | | |
| Co | | Remainder | Remainder | 9.0 | | | | | |
| Mo | 1.2 | | | | 1.2 | 2.0 | | | |
| V | 0.5 | | | | 0.5 | 1.5 | | | 0.2 |
| Al | | | | | | | | | 1.0 |
| Fe | Remainder | | 1.0 | 1.0 | Remainder | Remainder | | | Remainder |
| Remarks | SKD steel | Present alloy (1) | Present alloy (2) | Present alloy (3) | SKD steel | Present alloy (4) | Hard Cr plating | Ni Kanigen plating | SACM steel |

The injection molding machines each had a screw diameter of 28 mm and a shot capacity of 3 ounces. The injection molding machines used in Test Nos. 1 to 3 in Example 1 were ones in which the whole screw tip part (i.e., the check ring, the part to come into contact with the ring, and the screw tip) had been made from screw alloy 2 shown in Table 1 (present alloy (4)), the injection molding machines used in Test Nos. 4 to 7 in Example 1 were ones in which the whole screw tip part had been made from SUS440, and the injection molding machines used in Test Nos. 8 and 9 in Example 1 were ones in which the whole screw tip part had been made from TiC and WC, respectively. For Test No. 3 in Comparative Example 1, the injection molding machine was one in which the check ring, the part to come into contact with the ring, and the screw tip had been made by using screw alloy 5 shown in Table 1 (SACM steel).

Using the above-described injection molding machines, pellets of a polycarbonate resin for optical use (trade name, Iupilon H-4000; manufactured by Mitsubishi Gas Chemical Company, Inc., Japan) as a molding material were molded into optical disk substrates having a thickness of 1.2 mm and a diameter of 130 mm. The molding was conducted under conditions of a resin temperature of 320° C, a mold temperature of 80° C, and a molding cycle of 24 seconds, with all procedures being done in a class 1000 clean room. With respect to the molding of each molding machine, the disk obtained by the 200th shot was evaluated for the number of dust particles. The results obtained are shown in Tables 2-1 and 2-2.

The number of dust particles present in a polycarbonate resin was counted using a solution obtained by dissolving 1 g of the resin in 100 cc of methylene chloride, by means of a light-scattering particle diameter sensor.

TABLE 2-1

| | Test No. | Cylinder | Screw | Screw tip part | Number of dust particles [per g] | | |
|---|---|---|---|---|---|---|---|
| | | | | | $0.5-1.0$ $\mu m$ | $1.0-10$ $\mu m$ | $10-50$ $\mu m$ |
| Example 1: | 1 | 2 | 2 | Present alloy (4) | $1.2 \times 10^4$ | 210 | 0 |
| | 2 | 2 | 3 | Present alloy (4) | $1.0 \times 10^4$ | 200 | 0 |
| | 3 | 2 | 4 | Present alloy (4) | $1.1 \times 10^4$ | 210 | 0 |
| | 4 | 3 | 3 | SUS440 | $1.3 \times 10^4$ | 200 | 0 |
| | 5 | 4 | 3 | " | $1.4 \times 10^4$ | 210 | 0 |
| | 6 | 3 | 2 | " | $1.2 \times 10^4$ | 170 | 0 |
| | 7 | 4 | 2 | " | $1.1 \times 10^4$ | 180 | 0 |
| | 8 | 2 | 3 | TiC | $1.2 \times 10^4$ | 180 | 0 |
| | 9 | 2 | 3 | WC | $1.3 \times 10^4$ | 200 | 0 |
| Raw pellets | | | | | $0.7 \times 10^4$ | 160 | 0 |

TABLE 2-2

| Test No. | Cylinder | Screw | Screw tip part | Number of dust particles [per g] 0.5–1.0 μm | 1.0–10 μm | 10–50 μm |
|---|---|---|---|---|---|---|
| Comparative Example 1: | | | | | | |
| 1 | 1 | 1 | — | 12.5 × 10⁴ | 380 | 2 |
| 2 | 1 | 5 | — | 11.0 × 10⁴ | 750 | 3 |
| 3 | 1 | 4 | SACM | 9.5 × 10⁴ | 440 | 1 |
| 4 | 2 | 5 | — | 9.5 × 10⁴ | 550 | 2 |
| 5 | 1 | 5 | — | 12.5 × 10⁴ | 560 | 3 |
| 6 | 1 | 3 | — | 6.5 × 10⁴ | 350 | 1 |
| 7 | 1 | 2 | — | 6.8 × 10⁴ | 360 | 2 |
| 8 | 3 | 5 | — | 5.7 × 10⁴ | 370 | 1 |
| Raw pellets | | | | 0.7 × 10⁴ | 160 | 0 |

EXAMPLES 2 AND 3 AND COMPARATIVE EXAMPLES 2 AND 3

With respect to each of Test No. 3 of Example 1 in which cylinder 2 (present alloy (1)) and screw 4 (Ni plating +present alloy (4)) were employed, Test No. 4 of Example 1 in which cylinder 3 (present alloy (2)) and screw 3 (Cr plating +SUS440) were employed, Test No. 3 of Comparative Example 1 in which cylinder 1 (SKD steel) and screw 4 (Ni plating+SACM steel) were employed, and Test No. 4 of Comparative Example 1 in which cylinder 1 (SKD steel) and screw 5 (SACM steel) were employed, injection molding was discontinued and after the molding machine was left as it was for 2 hours with the cylinder temperature being kept at 320° C., injection molding was restarted and then a disk was sampled every 50 shots to examine in the number of dust particles having a particle size of 0.5 to 1.0 μm with the change in time. The results obtained are shown in Table 3.

TABLE 3

| Number of shots | Number of dust particles (per g) Example 2 (Ex. 1-3) | Example 3 (Ex. 1-4) | Comparative (Comp. Ex. 1-3) | Comparative (Comp. Ex. 1-4) |
|---|---|---|---|---|
| Pellets used | 0.70 × 10⁴ | 0.70 × 10⁴ | 0.70 × 10⁴ | 0.70 × 10⁴ |
| Just after restart | 45 × 10⁴ | 46 × 10⁴ | 87 × 10⁴ | 82 × 10⁴ |
| 50th shot | 2.8 × 10⁴ | 2.5 × 10⁴ | 13.0 × 10⁴ | 15.0 × 10⁴ |
| 100th shot | 1.5 × 10⁴ | 1.5 × 10⁴ | 10.0 × 10⁴ | 13.5 × 10⁴ |
| 150th shot | 1.4 × 10⁴ | 1.4 × 10⁴ | 9.8 × 10⁴ | 11.8 × 10⁴ |
| 200th shot | 1.2 × 10⁴ | 1.3 × 10⁴ | 9.5 × 10⁴ | 12.5 × 10⁴ |
| 250th shot | 1.1 × 10⁴ | 1.1 × 10⁴ | 9.7 × 10⁴ | 11.7 × 10⁴ |
| 300th shot | 1.2 × 10⁴ | 1.2 × 10⁴ | 10.5 × 10⁴ | 10.5 × 10⁴ |
| 350th shot | 1.1 × 10⁴ | 1.1 × 10⁴ | 10.7 × 10⁴ | 13.7 × 10⁴ |
| 400th shot | 1.0 × 10⁴ | 1.1 × 10⁴ | 9.8 × 10⁴ | 11.5 × 10⁴ |
| 450th shot | 1.0 × 10⁴ | 1.2 × 10⁴ | 10.5 × 10⁴ | 12.3 × 10⁴ |
| 500th shot | 1.1 × 10⁴ | 1.1 × 10⁴ | 10.7 × 10⁴ | 11.0 × 10⁴ |

Table 3 shows that in the case of the injection molding machines employing the specific materials according to the present invention, the dust levels dropped immediately and stable molding operations were attained. That is, increases in the number of dust particles having a particle size of 0.5 to 1.0 μm from the number thereof for the raw pellets were almost constant and as small as 0.3×10⁴ to 0.5×10⁴ per g in the process of this invention. In contrast to this, in the case of the injection molding machines employing conventional materials, the dust levels attained were unsatisfactory and varied widely.

EXAMPLE 4 AND COMPARATIVE EXAMPLE 4

Using injection molding machines having a screw diameter of 45 mm and a shot capacity of 5 ounces, molded articles in the form of a cylindrical, artificial dialyzer housing having a diameter of 5 cm, length of 30 cm, and wall thickness of 1.5 mm were produced by injection molding at a resin temperature of 300° C., a mold temperature of 100° C., and a molding cycle of 30 seconds.

The injection molding machines used were: one which was the same as that used in Example 1-2 (Test No. 1); one which employed cylinder 2 (present alloy components (1)) and a screw comprising hard chromium-plated SACM steel with the screw tip part being made from present alloy component (3) and Hastelloy C (Test No. 2); one which was the same as that used in Comparative Example 1—1 (Test No. 3); and one which employed a cylinder made from SACM steel and a screw comprising hard chromium-plated SACM steel with the screw tip part being made from nitrided SKD steel (Test No. 4).

With respect to each of the molded articles obtained, the dust particle number was counted and, further, the number of blush points having diameters of 50 μm or more was counted after the article was treated with steam at 125° C. for 100 hours. The results obtained are shown in Table 4.

TABLE 4

| Test No. | Number of dust particles [per g] 0.5–1.0 μm | 1.0–10 μm | 10–50 μm | Number of blush point |
|---|---|---|---|---|
| Example 4 | | | | |
| 1 | 7.0 × 10⁴ | 750 | 2 | 2 |
| 2 | 6.8 × 10⁴ | 730 | 2 | 2 |
| Comparative Example 4 | | | | |
| 3 | 15.5 × 10⁴ | 1250 | 260 | 260 |
| 4 | 16.5 × 10⁴ | 1280 | 260 | 310 |

The polycarbonate resin used in the above test was Iupilon S-3000R manufactured by Mitsubishi Gas Chemical Company, Inc., and this raw resin had been contaminated with dust particles of 0.5 to 1 μm in an amount of 4.5×10⁴ per g of the resin, dust particles of 1 to 10 μm in an amount of 560 per g, and dust particles of 10 to 50 μm in an amount of 0 per g.

The results shown in Table 4 show that, according to the present invention, not only can the increase in the dust particle number due to decomposition and deterioration during injection molding be restrained, but the molded articles obtained exhibit excellent resistance to hydrolysis.

While the invention has been described in detail and with reference to specific embodiments thereof, it will be apparent to one skilled in the art that various changes and modifications can be made therein without departing from the sprit and scope thereof.

What is claimed is:

1. In a process for producing a polycarbonate molded article having a low dust level from a polycarbonate resin in the form of a powder or pellets which comprises injection molding said polycarbonate resin using an injection molding machine, the improvement wherein the injection molding machine comprises a cylinder whose inner circumferential wall is made of a corrosion- and abrasion-resistant alloy selected from the group consisting of alloy components (1), (2), and (3) given below and a screw made of a member selected from the group consisting of a steel having a metal coating formed of a member selected from the group consisting of hard chromium plating, a steel having a metal coating formed of hard nickel plating, a steel having a metal coating formed of titanium carbide, a steel having a metal coating formed of tungsten carbide, SUS420, SUS440, Hastelloy C, and a steel comprising alloy components (4) given below:

Alloy components (1):
  C: 0.5-1.5 wt %
  Si: 1.0-2.0 wt %
  B: 0.5-2.5 wt %
  Ni: 10.0-20.0 wt %
  Cr: 20.0-30.0 wt %
  W: 10.0-20.0 wt %
  Cu: 0.5-2.0 wt %
  Remainder: Co and unavoidable impurities Alloy components (2):
  Ni: 0.0-2.0 wt %
  Cr: 5.0-15.0 wt %
  Fe: 0.0-1.0 wt %
  Mn: 0.1-2.0 wt%
  Si: 0.2-4.0 wt %
  B: 2.0-4.0 wt %
  Remainder: Co and unavoidable impurities, Alloy components (3):
  Cr: 5.0-10.0 wt %
  Co: 5.0-40.0 wt %
  Fe: 0.0-10.0 wt %
  Mn: 0.2-2.0 wt %
  Si: 2.0-10.0 wt %
  B: 2.0-4.0 wt %
  Remainder: Ni and unavoidable impurities, Alloy components (4):
  C: 0.5-1.5 wt %
  Cr: 10.0-20.0 wt %
  Mo: 1.5-2.5 wt %
  V: 0.5-1.5 wt %
  Remainder: Fe and unavoidable impurities.

2. A process for producing a polycarbonate molded article having a low dust level as claimed in claim 1, wherein the number of dust particles having a particle size of 0.5 to 1.0 $\mu$m present in said polycarbonate resin powder or pellets used in injection molding is $5.0 \times 10^4$ or less per g of the resin.

3. A process for producing a polycarbonate molded article having a low dust level as claimed in claim 1, wherein in said injection molding machine includes a screw and a check ring, the screw comprising a main body and a screw tip, the check ring being provided at the screw tip, wherein the main body of the screw is made of a steel having a metal coating formed of a member selected from the group consisting of hard chromium plating and hard nickel plating, and the check ring, the part of the screw which comes into contact with said check ring, and the screw tip are made of a member selected from the group consisting of a steel having a metal coating formed of titanium carbide, a steel having a metal coating formed of tungsten carbide, SUS420, SUS440, Hastelloy C, and a steel comprising alloy components (4).

4. A process for producing a polycarbonate molded article having a low dust level as claimed in claim 1, wherein said polycarbonate molded article made by injection molding is an optical disk or a lens.

* * * * *